United States Patent
Imai et al.

(10) Patent No.: US 12,434,641 B2
(45) Date of Patent: Oct. 7, 2025

(54) MOUNTED EQUIPMENT INFORMATION CONVERSION APPARATUS

(71) Applicant: ISUZU MOTORS LIMITED, Tokyo (JP)

(72) Inventors: Akira Imai, Fujisawa (JP); Takahiro Suesada, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 146 days.

(21) Appl. No.: 18/007,051

(22) PCT Filed: Sep. 21, 2021

(86) PCT No.: PCT/JP2021/034522
§ 371 (c)(1),
(2) Date: Jan. 27, 2023

(87) PCT Pub. No.: WO2022/030652
PCT Pub. Date: Feb. 10, 2022

(65) Prior Publication Data
US 2023/0278509 A1  Sep. 7, 2023

(30) Foreign Application Priority Data

Aug. 7, 2020 (JP) ................. 2020-134753

(51) Int. Cl.
*B60R 16/023* (2006.01)
(52) U.S. Cl.
CPC ................. *B60R 16/0231* (2013.01)
(58) Field of Classification Search
CPC .... B60R 16/0231; B60R 16/023; B60R 16/02
See application file for complete search history.

(56) References Cited

U.S. PATENT DOCUMENTS

| 2004/0062200 A1 | 4/2004 | Kesavan |
| 2004/0181324 A1 | 9/2004 | Arata |

(Continued)

FOREIGN PATENT DOCUMENTS

| CN | 1756164 A | 4/2006 |
| CN | 101151168 A | 3/2008 |

(Continued)

OTHER PUBLICATIONS

International Search Report of PCT/JP2021/034522 dated Oct. 26, 2021.

*Primary Examiner* — Carl C Staubach
*Assistant Examiner* — Charles J Brauch
(74) *Attorney, Agent, or Firm* — Shih IP Law Group, PLLC

(57) ABSTRACT

A mounted equipment information conversion apparatus includes: a mounted equipment information acquiring part that acquires, from a mounted equipment control device, mounted equipment information including control information used in the mounted equipment control device controlling a mounted equipment body, and mounted-equipment-side identification information for identifying the control information; and a mounted equipment information converting part that converts the mounted-equipment-side identification information included in the mounted equipment information into vehicle-body-side identification information associated with the mounted-equipment-side identification information, according to a conversion rule in which the vehicle-body-side identification information used in a vehicle body control device controlling a vehicle body connected to the mounted equipment body is associated with the mounted-equipment-side identification information.

7 Claims, 5 Drawing Sheets

(56) References Cited

U.S. PATENT DOCUMENTS

| | | |
|---|---|---|
| 2010/0019881 A1 | 1/2010 | Shimura |
| 2014/0201332 A1 | 7/2014 | Kataoka et al. |
| 2015/0362544 A1 | 12/2015 | Bean |
| 2016/0098096 A1 | 4/2016 | Averill et al. |
| 2017/0105137 A1 | 4/2017 | Hung et al. |
| 2017/0339056 A1 | 11/2017 | Uno |
| 2018/0139270 A1 | 5/2018 | Inoue et al. |
| 2020/0260033 A1 | 8/2020 | Yeo et al. |
| 2020/0361262 A1* | 11/2020 | Slade .................. H04W 76/14 |
| 2023/0164457 A1 | 5/2023 | Yeo et al. |
| 2023/0278508 A1 | 9/2023 | Imai et al. |
| 2023/0278509 A1 | 9/2023 | Imai et al. |

FOREIGN PATENT DOCUMENTS

| | | |
|---|---|---|
| CN | 103944830 A | 7/2014 |
| CN | 106572073 A | 4/2017 |
| CN | 107710294 A | 2/2018 |
| CN | 111556261 A | 8/2020 |
| DE | 102015012886 A1 | 4/2016 |
| JP | 2007-196971 A | 8/2007 |
| JP | 2009-023574 A | 2/2009 |
| JP | 2009-051345 A | 3/2009 |
| JP | 2014-083874 A | 5/2014 |
| JP | 2016-111646 A | 6/2016 |
| JP | 2022-030624 A | 2/2022 |

\* cited by examiner

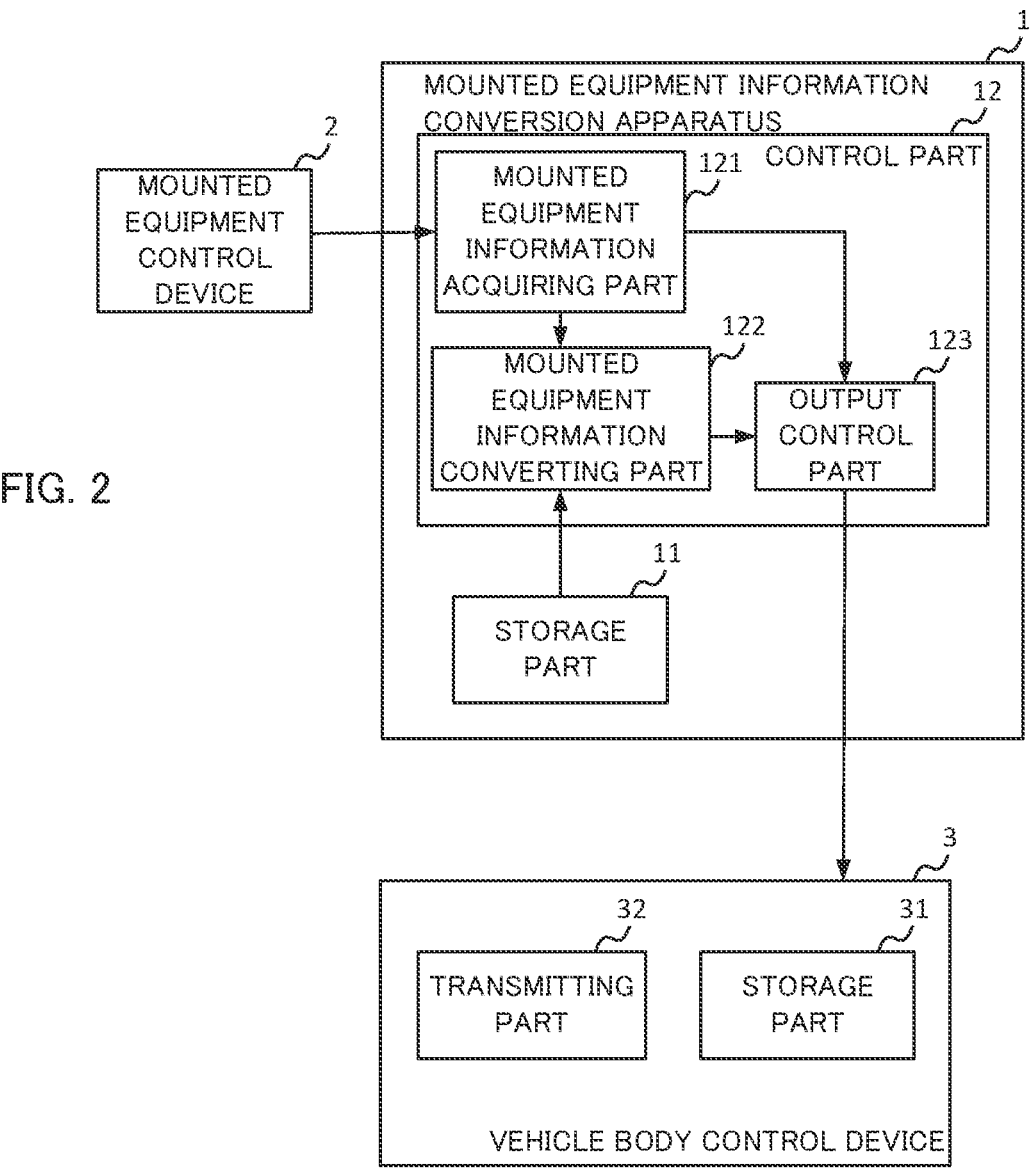

MOUNTED EQUIPMENT INFORMATION CONVERSION APPARATUS

CROSS-REFERENCE TO RELATED APPLICATIONS

The present application is a U.S. National Stage entry of PCT Application number PCT/JP2021/034522, filed on Sep. 21, 2021, which claims priority under 35 U.S.C § 119(a) to Japanese Patent Application No. 2020-134753, filed on Aug. 7, 2020, contents of which are incorporated herein by reference in their entirety.

TECHNICAL FIELD

The present disclosure relates to a technique for transmitting and receiving information between a vehicle body and a mounted equipment body of a vehicle.

BACKGROUND OF THE INVENTION

Patent Document 1 discloses a technique of transmitting mounted equipment information output from a mounted equipment control device installed in a mounted equipment body, to a vehicle body control device installed in a vehicle body.

PRIOR ART

Patent Document

Patent Document 1: Japanese Unexamined Patent Application Publication No. 2009-023574

BRIEF DESCRIPTION OF THE INVENTION

Problem to be Solved by the Invention

The mounted equipment information output from the mounted equipment body includes control information for controlling the mounted equipment body and identification information for identifying the control information. At this time, if identification information for identifying control information used in the mounted equipment control device and identification information for identifying control information used in the vehicle body control device compete with each other, the vehicle body control device cannot correctly process the control information.

The present disclosure focuses on these points, and its object is to correctly process the control information.

Means for Solving the Problem

In a first aspect of the present disclosure, a mounted equipment information conversion apparatus that converts mounted equipment information used in a mounted equipment control device controlling a mounted equipment body to output to a vehicle body control device controlling a vehicle body connected to the mounted equipment body is provided, and the mounted equipment information conversion apparatus includes: a mounted equipment information acquiring part that acquires, from the mounted equipment control device, the mounted equipment information including control information used for controlling the mounted equipment body and mounted-equipment-side identification information for identifying the control information; and a mounted equipment information converting part that converts the mounted-equipment-side identification information included in the mounted equipment information acquired by the mounted equipment information acquiring part into vehicle-body-side identification information associated with the mounted-equipment-side identification information, according to a conversion rule in which the vehicle-body-side identification information used in the vehicle body control device is associated with the mounted-equipment-side identification information.

The mounted equipment information conversion apparatus may further include a storage part that stores a conversion table in which the vehicle-body-side identification information is associated with the mounted-equipment-side identification information, as the conversion rule, wherein the mounted equipment information converting part may convert the mounted-equipment-side identification information into the vehicle-body-side identification information by referencing the conversion table stored in the storage part.

The mounted equipment information converting part may convert the mounted-equipment-side identification information into the vehicle-body-side identification information, and need not convert the control information, and the mounted equipment information conversion apparatus may further include an output control part that outputs, to the vehicle body control device, converted mounted equipment information in which the mounted-equipment-side identification information has been converted into the vehicle-body-side identification information by the mounted equipment information converting part and in which the control information has not been converted, to cause a storage part of the vehicle body control device to store the converted mounted equipment information.

The mounted equipment information acquiring part may further acquires, together with the mounted equipment information, a transmission instruction for transmitting the mounted equipment information to an external device, and the output control part may cause the converted mounted equipment information, in which the mounted-equipment-side identification information has been converted into the vehicle-body-side identification information by the mounted equipment information converting part and in which the control information has not been converted, to be transmitted to the external device via the vehicle body control device, if the mounted equipment information acquiring part acquires the transmission instruction.

The mounted equipment information acquiring part may further acquire a transmission instruction for transmitting the mounted equipment information to an external device, and if the transmission instruction is acquired together with the mounted equipment information, the output control part may cause the converted mounted equipment information to be transmitted to the external device without causing the converted mounted equipment information to be stored in the storage part of the vehicle body control device, and if only the mounted equipment information is acquired, the output control part may cause the converted mounted equipment information to be stored in the storage part of the vehicle body control device.

The mounted equipment information acquiring part may acquire the control information represented by at least one of binary numbers or hexadecimal numbers.

The storage part may store, as the conversion rule, a conversion table in which the vehicle-body-side identification information is associated with the mounted-equipment-side identification information, and the mounted equipment information acquiring part may acquire a new conversion table, and updates the conversion table stored in the storage part to the acquired new conversion table.

Effect of the Invention

According to the present disclosure, it is possible to process information correctly.

BRIEF DESCRIPTION OF THE DRAWINGS

FIG. 2 is a diagram for explaining a configuration of a mounted equipment information conversion apparatus according to the embodiment.

FIG. 3 schematically shows a conversion table.

DETAILED DESCRIPTION OF THE EMBODIMENTS

Outline of the Information Transmission System S

Figure 1:
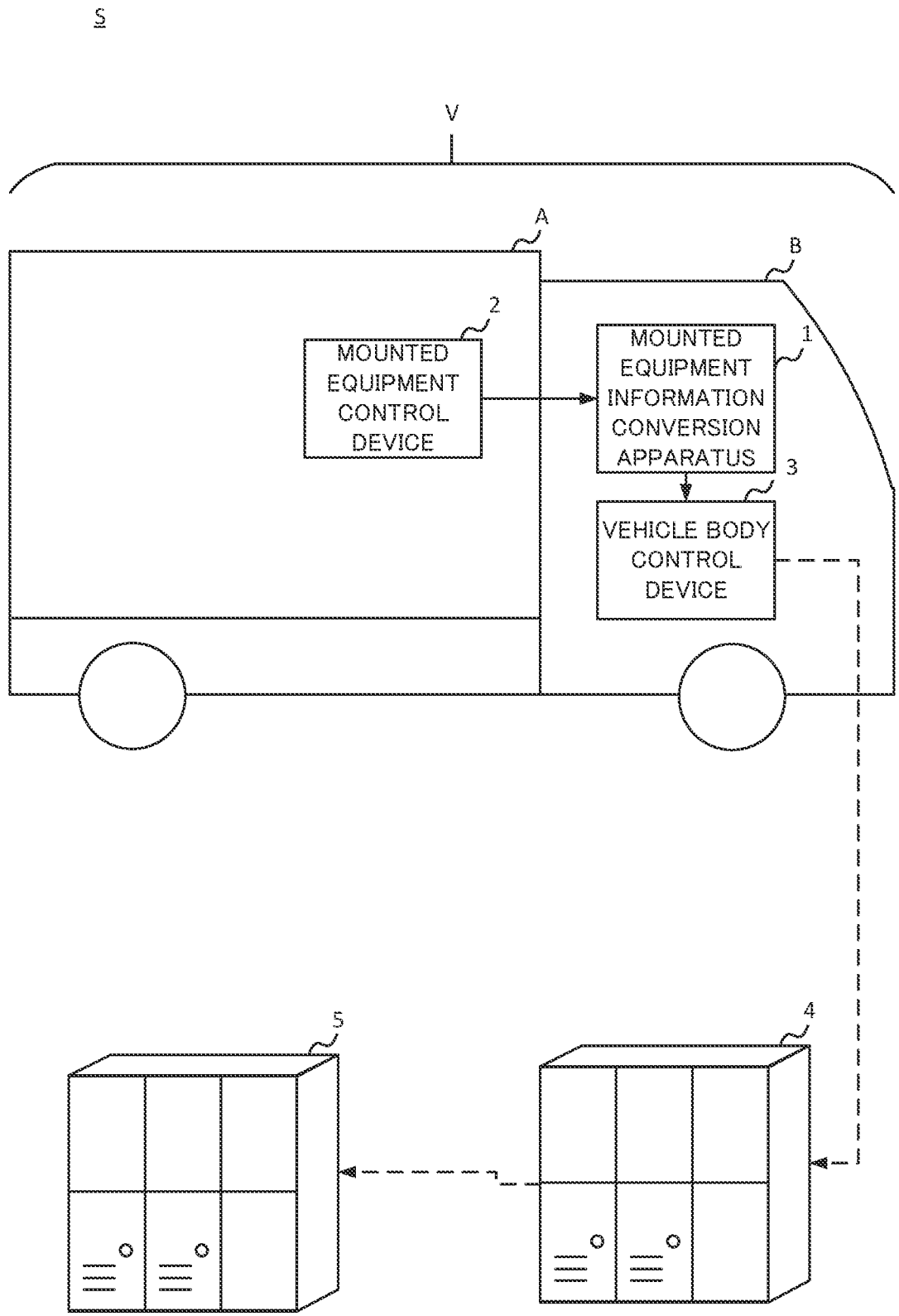
FIG. 1 is a diagram for explaining an outline of an information transmission system according to an embodiment.

FIG. 1 is a diagram for explaining an outline of an information transmission system S according to an embodiment. The information transmission system S includes a vehicle V, a vehicle body server 4, and a mounted equipment server 5. The vehicle body server 4 is a server managed by an operator who manufactures a vehicle body B of the vehicle V. The mounted equipment server 5 is a server managed by an operator who manufactures a mounted equipment body A. The vehicle V and the vehicle body server 4 are connected to each other in a manner enabling communication. Further, the vehicle body server 4 and the mounted equipment server 5 are connected to each other in a manner enabling communication. The information transmission system S transmits information concerning the vehicle body B to the vehicle body server 4. Further, the information transmission system S transmits information concerning the mounted equipment body A to the mounted equipment server 5 via the vehicle body server 4.

The vehicle V includes the mounted equipment body A and the vehicle body B connected to the mounted equipment body A. The vehicle V is a dump truck, a concrete mixer, a tank truck, a refrigerator freezer vehicle, an aerial work vehicle, a campaign vehicle, a fire engine, or an ambulance, for example. The mounted equipment body A is equipped with various devices for operating the mounted equipment body A and a sensor that detects states of the various devices. For example, if the mounted equipment body A is an aerial work vehicle, the mounted equipment body A is equipped with a lift for raising and lowering a work platform on which an operator rides during operation, and a sensor that detects the state of the lift (such as oil pressure of a cylinder). Further, the mounted equipment body A is equipped with a mounted equipment control device 2 that controls various devices installed in the mounted equipment body A.

The vehicle body B is equipped with a vehicle body control device 3 that controls the vehicle body B. The vehicle body control device 3 includes a storage part (a storage part 31 in FIG. 2) and a transmitting part (a transmitting part 32 in FIG. 2). The storage part 31 stores information used for controlling the vehicle body B. The storage part 31 contains storage media such as a Read Only Memory (ROM), a Random Access Memory (RAM), and a hard disk. The storage part 31 stores vehicle body information including control information used for controlling the vehicle body B and vehicle-body-side identification information for identifying the control information.

The transmitting part 32 is a wireless communication module for transmitting at least any of information concerning the vehicle body B and information concerning the mounted equipment body A to the vehicle body server 4. The transmitting part 32 can transmit information to the vehicle body server 4 using a mobile phone network, for example. The mobile phone network is the fourth generation mobile communication system or the fifth generation mobile communication system, for example. The transmitting part 32 may transmit information to the vehicle body server 4 using Wi-Fi (a registered trademark) or Bluetooth (a registered trademark).

The mounted equipment control device 2 outputs, to the vehicle body B, mounted equipment information including control information used for controlling the mounted equipment body A and mounted-equipment-side identification information for identifying the control information. At this time, if the mounted-equipment-side identification information used in the mounted equipment control device 2 and the vehicle-body-side identification information used in the vehicle body control device 3 compete with each other, the vehicle body control device 3 cannot correctly process the control information included in the mounted equipment information. That is, if the same identification information is used in the mounted-equipment-side identification information and the vehicle-body-side identification information, the vehicle body control device 3 may process the control information concerning the mounted equipment body A as the control information concerning the vehicle body B.

Here, the vehicle V is equipped with a mounted equipment information conversion apparatus 1 that converts the mounted equipment identification information and outputs the converted mounted equipment identification information to the vehicle body control device 3. The mounted equipment information conversion apparatus 1 converts the mounted-equipment-side identification information into the vehicle-body-side identification information so that the mounted-equipment-side identification information and the vehicle-body-side identification information do not compete with each other. Accordingly, since the mounted-equipment-side identification information and the vehicle-body-side identification information do not compete with each other, the vehicle body control device 3 can correctly process the mounted equipment information.

Configuration of the Mounted Equipment Information Conversion Apparatus 1 According to the Embodiment FIG. 2 is a diagram for explaining a configuration of the mounted equipment information conversion apparatus 1 according to the embodiment. The mounted equipment information conversion apparatus 1 includes a storage part 11 and a control part 12. The storage part 11 contains storage media such as a ROM, a RAM, and a hard disk. The storage part 11 stores a program executed by the control part 12.

Further, the storage part 11 stores a conversion rule in which the vehicle-body-side identification information used in the vehicle body control device 3 is associated with the mounted-equipment-side identification information. For example, the storage part 11 stores a conversion table in which the vehicle-body-side identification information is associated with the mounted-equipment-side identification information, as the conversion rule. FIG. 3 schematically shows a conversion table R. As shown in FIG. 3, the mounted-equipment-side identification information and the vehicle-body-side identification information are associated with each other in one-to-one correspondence. For example, the vehicle-body-side identification information [11] is associated with the mounted-equipment-side identification information [01].

The control part 12 is a calculation resource including a processor such as a Central Processing Unit (CPU). By executing a program stored in the storage part 11, the control part 12 functions as a mounted equipment information acquiring part 121, a mounted equipment information converting part 122, and an output control part 123.

Figure 4:
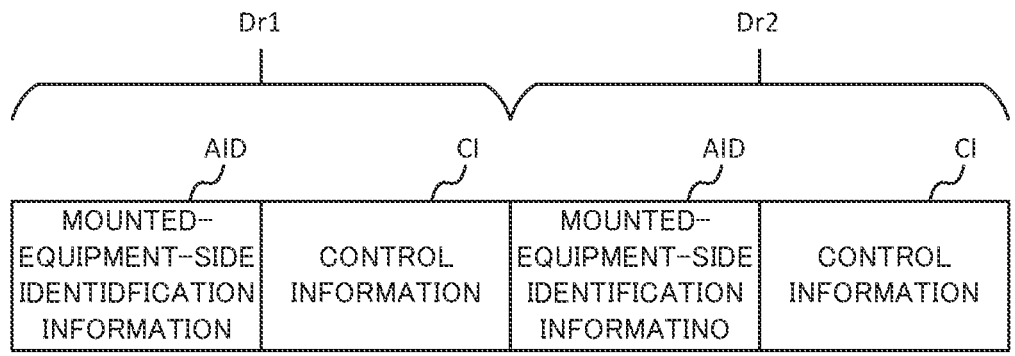
FIG. 4 is a diagram for explaining mounted equipment information.

The mounted equipment information acquiring part 121 acquires, from the mounted equipment control device 2, mounted equipment information including control information used for controlling the mounted equipment body A and mounted-equipment-side identification information for identifying the control information. FIG. 4 is a diagram for explaining mounted equipment information Dr. The mounted equipment control device 2 outputs a plurality of pieces of mounted equipment information Dr (mounted equipment information Dr1 and mounted equipment information Dr2). Alternatively, the mounted equipment control device 2 may output one piece of mounted equipment information Dr or three or more pieces of mounted equipment information Dr.

The mounted equipment information Dr includes mounted-equipment-side identification information AID and control information CI. Each piece of the mounted-equipment-side identification information AID and the control information CI is digital data represented by 0 and 1. It should be noted that the mounted equipment control device 2 outputs the plurality of pieces of mounted equipment information Dr at a predetermined time interval. The predetermined time interval is 30 milliseconds, for example. The mounted equipment information acquiring part 121 sequentially acquires the mounted equipment information Dr output by the mounted equipment control device 2.

The mounted equipment information acquiring part 121 may acquire mounted equipment information Dr at an interval longer than the time interval at which the mounted equipment control device 2 outputs mounted equipment information Dr. For example, the mounted equipment information acquiring part 121 acquires mounted equipment information Dr output from the mounted equipment control device 2 after 100 milliseconds, longer than 30 milliseconds, have passed since the mounted equipment information Dr was acquired. Specifically, the mounted equipment information acquiring part 121 discards mounted equipment information Dr output from the mounted equipment control device 2 by the time when 100 milliseconds pass after mounted equipment information Dr was acquired. Due to this, the mounted equipment information acquiring part 121 can reduce the processing load by preventing the acquisition of more information than necessary.

The control information CI is information for controlling the mounted equipment body A, such as the oil pressure of a cylinder, an operating state of various devices installed in the mounted equipment body A, or a failure code used when a failure occurs in the various devices. The control information CI may include the name of a mounted equipment manufacturer, a model or a type of the mounted equipment body, a product serial number of the mounted equipment body, or the like.

It should be noted that the mounted equipment information acquiring part 121 can acquire the control information CI without knowing details of the control information CI. In other words, the mounted equipment information acquiring part 121 acquires the control information CI as digital data represented by binary numbers of 0 and 1, and does not acquire details of the information indicated by the acquired digital data. Alternatively, the control information CI may be represented not only by binary numbers but also by hexadecimal numbers. Due to this, another user cannot grasp what the value of the control information CI means, for example. As a result, a user who manages the mounted equipment server 5 can keep the content of the control information CI secret from other users.

The mounted equipment information converting part 122 converts the mounted equipment information Dr into converted mounted equipment information. For example, the mounted equipment information converting part 122 converts the mounted-equipment-side identification information AID included in the mounted equipment information Dr into vehicle-body-side identification information BID associated with the mounted-equipment-side identification information AID. Specifically, the mounted equipment information converting part 122 converts the mounted-equipment-side identification information AID into the vehicle-body-side identification information BID in accordance with a predetermined conversion rule. More specifically, first, the mounted equipment information converting part 122 references the conversion table R stored in the storage part 11, and specifies the vehicle-body-side identification information BID associated with the acquired mounted-equipment-side identification information AID. Then, the mounted equipment information converting part 122 converts the acquired mounted-equipment-side identification information AID into the specified vehicle-body-side identification information BID. It should be noted that the mounted equipment information converting part 122 converts the mounted-equipment-side identification information AID included in the mounted equipment information Dr into the vehicle-body-side identification information BID, but does not convert the control information CI.

Figure 5:
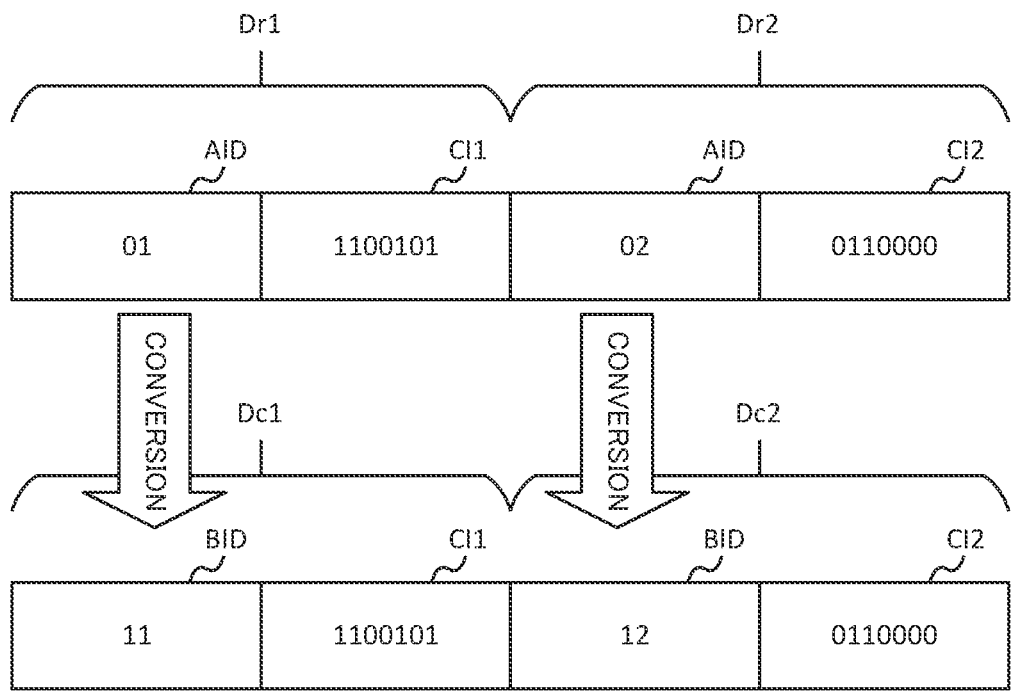
FIG. 5 is a diagram for explaining processing of converting the mounted equipment information into converted mounted equipment information.

FIG. 5 is a diagram for explaining processing of converting the mounted equipment information Dr into converted mounted equipment information Dc. As shown in FIG. 5, the mounted equipment information converting part 122 converts the mounted-equipment-side identification information AID [01] included in the mounted equipment information Dr1 into the vehicle-body-side identification information BID [11] by referencing the conversion table R. Further, the mounted equipment information converting part 122 does not convert the control information CI1 [1100101] included in the mounted equipment information Dr1. In this manner, the mounted equipment information converting part 122 converts the mounted equipment information Dr1 into converted mounted equipment information Dc1. Similarly, the mounted equipment information converting part 122 converts the mounted-equipment-side identification information AID [02] included in the mounted equipment information Dr2 into the vehicle-body-side identification information BID [12], and converts the mounted equipment information Dr2 into converted mounted equipment information Dc2 without converting the control information CI2 [0110000].

It should be noted that a data length of the mounted equipment information Dr is not limited to the above, and may be appropriately set. That is, the length of the mounted-equipment-side identification information AID and the length of the control information CI may be appropriately set, in consideration of the specifications of the mounted equipment control device 2.

The output control part 123 outputs the converted mounted equipment information Dc obtained by converting the mounted equipment information Dr with the mounted equipment information converting part 122, to the vehicle body control device 3. Specifically, the output control part 123 outputs, to the vehicle body control device 3, the converted mounted equipment information Dc in which the mounted-equipment-side identification information AID included in the mounted equipment information Dr has been converted into the vehicle-body-side identification information BID and in which the control information CI has not been converted. More specifically, the output control part 123 outputs the converted mounted equipment information Dc to the vehicle body control device 3, thereby causing the storage part 31 of the vehicle body control device 3 to store the converted mounted equipment information Dc. Upon acquiring the converted mounted equipment information Dc, the vehicle body control device 3 stores the converted mounted equipment information Dc in the storage part 31 of the vehicle body control device 3. The mounted equipment information conversion apparatus 1 converts identification information in this manner. Due to this, the vehicle body control device 3 can correctly store the converted mounted equipment information Dc together with vehicle body information in the storage part 31 of the vehicle body control device 3, while preventing competition in the identification information.

Further, the output control part 123 may cause the converted mounted equipment information Dc to be transmitted to an external device. For example, the output control part 123 causes the converted mounted equipment information Dc to be transmitted to at least one of the vehicle body server 4 and the mounted equipment server 5, which are external devices, via the transmitting part 32 of the vehicle body control device 3. In this case, the mounted equipment control device 2 outputs a transmission instruction to transmit the mounted equipment information Dr to the external device, and the mounted equipment information acquiring part 121 further acquires the transmission instruction.

Figure 6:
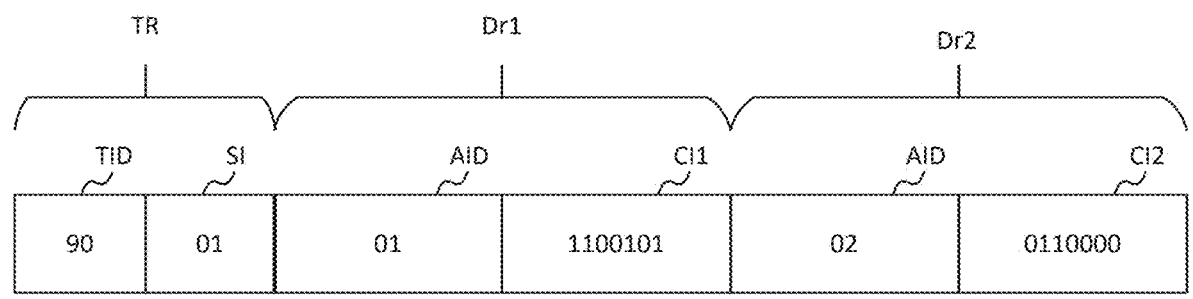
FIG. 6 is a diagram for explaining a transmission instruction.

FIG. 6 is a diagram for explaining a transmission instruction TR. The mounted equipment control device 2 outputs the transmission instruction TR together with the mounted equipment information Dr. The transmission instruction TR includes transmission identification information TID for identifying the transmission instruction TR and instruction information SI indicating whether or not to transmit the mounted equipment information Dr, for example. The transmission identification information TID is set in advance, and [90] is set as the transmission identification information TID in the present embodiment. Further, in the present embodiment, if the instruction information SI is [00], the instruction information SI indicates that the mounted equipment information Dr is not to be transmitted, and if the instruction information SI is [01], the instruction information SI indicates that the mounted equipment information Dr is to be transmitted.

The mounted equipment information acquiring part 121 acquires the transmission instruction TR output by the mounted equipment control device 2. If the mounted equipment information acquiring part 121 acquires the transmission instruction TR including the instruction information [01] indicating that the mounted equipment information Dr is to be transmitted, the mounted equipment information acquiring part 121 notifies the output control part 123 of an instruction to transmit the mounted equipment information Dr1 acquired together with the transmission instruction TR. Then, upon receiving the instruction to transmit the mounted equipment information Dr1 from the mounted equipment information acquiring part 121, the output control part 123 transmits the converted mounted equipment information Dc to the mounted equipment server 5 via the transmitting part 32 of the vehicle body control device 3 and the vehicle body server 4.

In this manner, the output control part 123 can transmit the converted mounted equipment information Dc to the mounted equipment server 5 at a timing when the mounted equipment control device 2 has output the transmission instruction TR. Therefore, by having the mounted equipment control device 2 output the transmission instruction TR at a predetermined timing, the output control part 123 can transmit the converted mounted equipment information Dc to the mounted equipment server 5 at a predetermined timing. As a result, if a failure occurs in the mounted equipment body A or if a part thereof needs to be replaced, the output control part 123 can immediately transmit the converted mounted equipment information Dc to the mounted equipment server 5 without causing the converted mounted equipment information Dc to be stored in the vehicle body control device 3.

Flow of Processing Executed by the Mounted Equipment Information Conversion Apparatus 1

Figure 7:
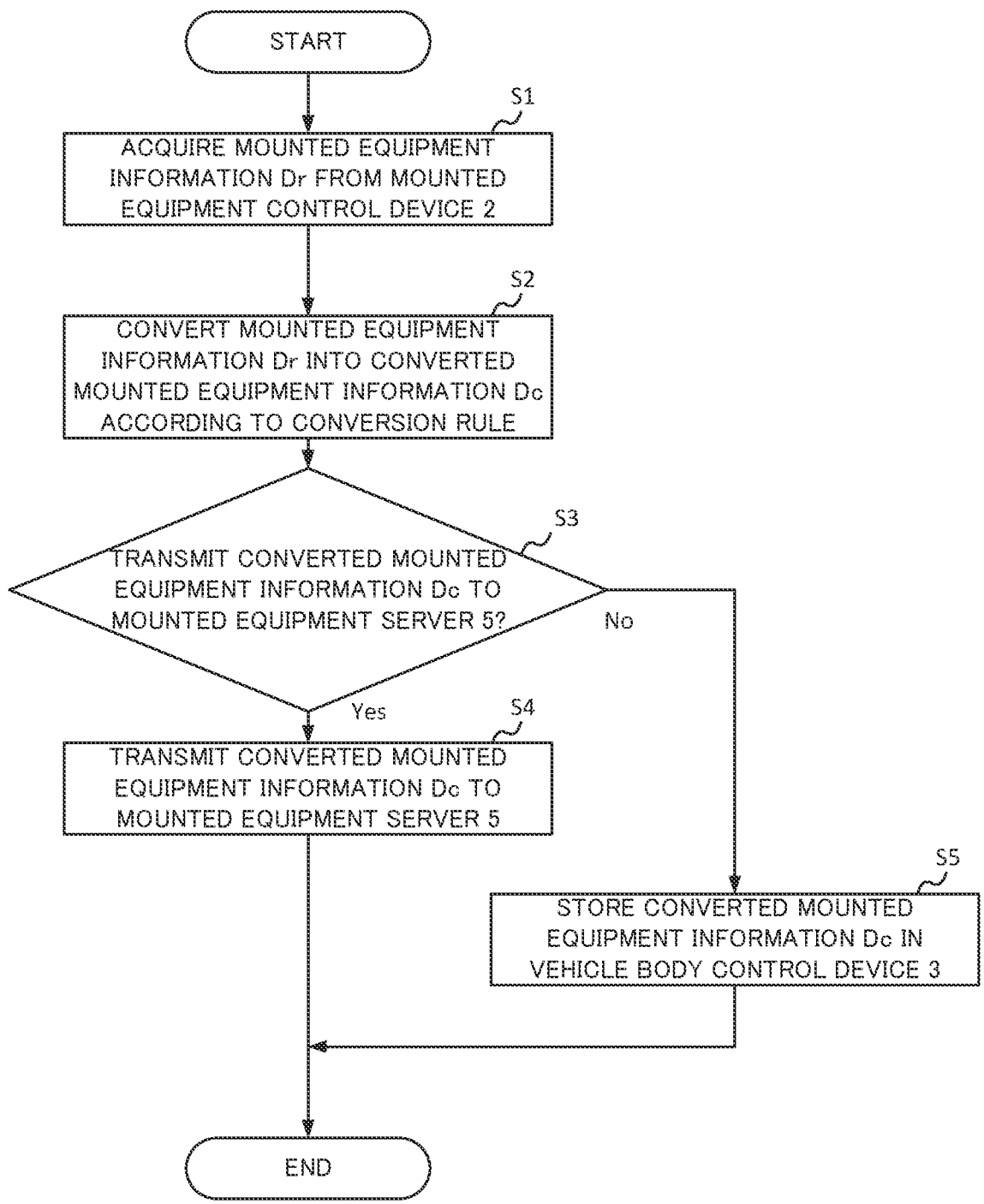
FIG. 7 is a flowchart showing an example of a flow of processing executed by the mounted equipment information conversion apparatus.

FIG. 7 is a flowchart showing an example of a flow of processing executed by the mounted equipment information conversion apparatus 1. First, the mounted equipment information acquiring part 121 acquires the mounted equipment information Dr from the mounted equipment control device 2 (S1). For example, the mounted equipment information acquiring part 121 acquires the mounted equipment information Dr from the mounted equipment control device 2 at a time interval (100 milliseconds) longer than the time interval (30 milliseconds) at which the mounted equipment control device 2 outputs the mounted equipment information Dr.

Next, the mounted equipment information converting part 122 converts the mounted equipment information Dr into the converted mounted equipment information Dc according to the conversion rule stored in the storage part 11 (S2). Specifically, the mounted equipment information converting part 122 converts the mounted-equipment-side identification information AID into the vehicle-body-side identification information BID by referencing the conversion table R stored in the storage part 11.

Subsequently, the output control part 123 determines whether or not to transmit the converted mounted equipment information Dc, converted by the mounted equipment information converting part 122, to the mounted equipment server 5 (S3). Specifically, if the instruction information SI included in the transmission instruction TR indicates that the mounted equipment information Dr is to be transmitted ("Yes" in S3), the output control part 123 determines that the mounted equipment information Dr is to be transmitted to the mounted equipment server 5. Then, the output control part 123 transmits the converted mounted equipment information Dc to the mounted equipment server 5 (S4). For example, the output control part 123 transmits the converted mounted equipment information Dc to the mounted equipment server 5 via the transmitting part 32 of the vehicle body control device 3 and the vehicle body server 4.

Even if it is indicated that the mounted equipment information Dr is to be transmitted, the output control part 123 may cause the storage part 31 of the vehicle body control device 3 to store the converted mounted equipment information Dc. That is, if the instruction information SI included in the transmission instruction TR indicates that the mounted equipment information Dr is to be transmitted, the output control part 123 causes the converted mounted equipment information Dc to be transmitted to the mounted equipment server 5 and causes the storage part 31 of the vehicle body control device 3 to store the converted mounted equipment information Dc.

If the instruction information SI included in the transmission instruction TR indicates that the mounted equipment information Dr is not to be transmitted ("No" in S3), the output control part 123 determines that the mounted equipment information Dr is not to be transmitted to the mounted equipment server 5. In this case, the output control part 123 outputs the converted mounted equipment information Dc to the vehicle body control device 3, thereby causing the storage part 31 of the vehicle body control device 3 to store the converted mounted equipment information Dc (S5).

Modified Example

The conversion table R, which is a conversion rule, may be rewritable. For example, the mounted equipment information acquiring part 121 acquires a new conversion table R from the mounted equipment server 5 via the vehicle body server 4 and the vehicle body control device 3. Then, the mounted equipment information acquiring part 121 updates the conversion table R stored in the storage part 11 of the mounted equipment information conversion apparatus 1 to the acquired new conversion table R. Due to this, an operator who manufactures the mounted equipment body A can appropriately rewrite the conversion rule.

Effects of the Mounted Equipment Information Conversion Apparatus 1 According to the Embodiment As described above, the mounted equipment information conversion apparatus 1 acquires, from the mounted equipment control device 2, the mounted equipment information Dr including the control information CI used for controlling the mounted equipment body A and the mounted-equipment-side identification information AID for identifying the control information CI. Then, the mounted equipment information conversion apparatus 1 converts the mounted-equipment-side identification information AID included in the acquired mounted equipment information Dr into the vehicle-body-side identification information BID associated with the mounted-equipment-side identification information AID, according to the conversion rule in which the vehicle-body-side identification information BID used in the vehicle body control device 3 is associated with the mounted-equipment-side identification information AID. In this manner, the mounted equipment information conversion apparatus 1 can appropriately convert the mounted-equipment-side identification information AID into the vehicle-body-side identification information BID so that the mounted-equipment-side identification information AID and the vehicle-body-side identification information BID do not compete with each other. As a result, the vehicle body control device 3 can correctly process the control information CI included in the mounted equipment information Dr obtained from the mounted equipment control device 2, and can correctly store the control information CI for controlling the mounted equipment body A in the storage part 31 of the vehicle body control device 3.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

DESCRIPTION OF THE REFERENCE NUMERALS

1 mounted equipment information conversion apparatus
11 storage part
12 control part
121 mounted equipment information acquiring part
122 mounted equipment information converting part
123 output control part
2 mounted equipment control device
3 vehicle body control device
31 storage part
32 transmitting part
4 vehicle body server
5 mounted equipment server

The invention claimed is:

1. A mounted equipment information conversion apparatus that converts mounted equipment information used in a mounted equipment control device controlling a mounted equipment body, and outputs converted mounted equipment information to a vehicle body control device controlling a vehicle body connected to the mounted equipment body, the mounted equipment information conversion apparatus comprising:

a mounted equipment information acquiring part that acquires, from the mounted equipment control device, the mounted equipment information including control information that is used for controlling a device to be controlled provided to the mounted equipment body, mounted-equipment-side identification information for identifying the control information, and a transmission instruction for transmitting the mounted equipment information to an external device managed by an operator who manufactures;

a mounted equipment information converting part that converts mounted-equipment-side identification information included in the mounted equipment information acquired by the mounted equipment information acquiring part into vehicle-body-side identification information, which differs from and is associated in one-to-one correspondence with the mounted-equipment-side identification information, according to a conversion rule in which the vehicle-body-side identification information used in the vehicle body control device and mounted-equipment-side identification information are associated with each other in one-to-one correspondence; and an output control part that:

if the transmission instruction including the instruction information indicating that the mounted equipment information is to be transmitted is acquired together with the mounted equipment information, causes a converted mounted equipment information to be transmitted to the external device without causing the converted mounted equipment information to be stored in the storage part of the vehicle body control device, and if only the mounted equipment information is acquired, causes the converted mounted equipment information to be stored in the storage part of the vehicle body control device.

2. The mounted equipment information conversion apparatus according to claim 1, further comprising:

a storage part that stores a conversion table in which the vehicle-body-side identification information is associated with the mounted-equipment-side identification information, as the conversion rule, wherein the mounted equipment information converting part converts the mounted-equipment-side identification information into the vehicle-body-side identification information by referencing the conversion table stored in the storage part.

3. The mounted equipment information conversion apparatus according to claim 1, wherein the mounted equipment information converting part converts the mounted-equipment-side identification information into the vehicle-body-side identification information, and does not convert the control information, and the output control part outputs, to the vehicle body control device, the converted mounted equipment information in which the mounted-equipment-side identification information has been converted into the vehicle-body-side identification information by the mounted equipment information converting part and in which the control information has not been converted, to cause a storage part of the vehicle body control device to store the converted mounted equipment information.

4. The mounted equipment information conversion apparatus according to claim 3, wherein the output control part causes the converted mounted equipment information, in which the mounted-equipment-side identification information has been converted into the vehicle-body-side identification information by the mounted equipment information converting part and in which the control information has not been converted, to be transmitted to the external device via the vehicle body control device, if the mounted equipment information acquiring part acquires the transmission instruction.

5. The mounted equipment information conversion apparatus according to claim 1, wherein the mounted equipment information acquiring part acquires the control information represented by at least one of binary numbers or hexadecimal numbers.

6. The mounted equipment information conversion apparatus according to claim 1, wherein the storage part stores, as the conversion rule, a conversion table in which the vehicle-body-side identification information is associated with the mounted-equipment-side identification information, and the mounted equipment information acquiring part acquires a new conversion table, and updates the conversion table stored in the storage part to the acquired new conversion table.

7. The mounted equipment information conversion apparatus according to claim 3, wherein the mounted equipment information acquiring part acquires, from the mounted equipment control device, a) control information includes information indicating a state of the device to be controlled, b) the mounted equipment information, and c) instruction information indicating whether or not to transmit the mounted equipment information to an external device the mounted equipment body, and if the instruction information does not indicate that the mounted equipment information is to be transmitted to the external device, the output control part outputs, to the vehicle body control device, converted mounted equipment information in which the mounted-equipment-side identification information has been converted into the vehicle-body-side identification information by the mounted equipment information converting part, and causes the storage part of the vehicle body control device to store the converted mounted equipment information, and if the instruction information indicates that the mounted equipment information is to be transmitted to the external device, the output control part transmits the converted mounted equipment information to the external device without causing the converted mounted equipment information to be stored in the storage part of the vehicle body control device.

* * * * *